Patented Dec. 23, 1941

2,267,617

UNITED STATES PATENT OFFICE 2,267,617

MOTHPROOFING

Henry N. Mitchell, Sanford, Maine, assignor to M. H. Hoepli, New York, N. Y.

No Drawing. Application November 8, 1938, Serial No. 239,462

4 Claims. (Cl. 167—37)

This invention relates to mothproofing and is herein disclosed in some detail as embodied in solutions and processes suitable for mothproofing as an incident to the so-called dry cleaning of fabrics.

Various solutions and processes have been devised which effectively mothproofed woolen fabrics and other animal fibers such as furs, but these are open to various objections. Some processes use a water solution, with the result that the mothproofing substance is washed out, as by rain, and thus becomes useless, even though at least one such process is completely effective in protecting wool against moths if kept dry.

Other, and less effective processes, depend upon dissolving a different mothproofing substance in an organic solvent, and applying the solution to the textile or other material which is to be mothproofed. Many such processes have been proposed and have proved to be of some utility in diminishing the attack by moths, but have required expensive or special solvents which entailed high cost unless recovered, and, in any event, the substances used for mothproofing had proved less effective than the water-soluble substances, so that these organic solvent-soluble substances had not been able to compete with the water-soluble substances except in a very small way for special work.

Moreover, any mothproofing substance, to be commercially available must be extracted from its solution by the wool or other material in a manner analogous to the extraction of dye from a solution. No commercial mothproofing process will be satisfactory if it depends upon depositing the mothproofing substance by evaporation of the solvent. It must cause the mothproofing substance to be deposited in a manner analogous to a dye.

In other words the garment or other material to be mothproofed must have an affinity for the substance such that the mothproofing substance adheres to the material by preferential affinity, with the result that the material extracts substantially the whole of the substance from the solvent in which it is carried, even though the run-off of solvent is very great.

Some substances which held out promise for effective mothproofing were colored and altered the color of the materials mothproofed. Still others tendered the cloth or chemically affected the colors, especially the delicate tints of certain dyed fabrics. Other substances stiffened or otherwise altered either the fabrics treated or other fibres present such as rayon and acetate rayon. Others were volatile or carried a distinct odor. Still others were toxic to human beings.

According to the present invention the difficulties summarized above, and other difficulties are overcome, and a solution is provided which contains a non-toxic substance meeting all the requirements of effective mothproofing, requires no large amount of special solvent other than that used in ordinary drycleaning procedures, a solution from which the non-toxic mothproofing substance is extracted just as a dye is extracted, and which, in addition, gives a permanent, odorless, colorless mothproofing, and without effect upon the tints and colors of dyed materials. Moreover, the mothproofing chemical is not removed by subsequent treatment with ordinary dry cleaning solvents.

Although, if desired the chemical described may be removed by washing with warm soap and water solution.

In addition the described treatment is found to afford equal protection against carpet beetles which are not repelled by many fabrics treated by other mothproofing methods.

The solution cleans from grease and dirt as effectively as standard dry cleaning solvents and enables mothproofing to be effected at trivial cost as an incident to dry cleaning.

But, if desired, mothproofing may be effected by spraying or sponging on fabrics or, for example, on upholstered furniture.

Other features and advantages will hereinafter appear.

One half ounce of a mixture of fifty-eight parts of salicylic acid and forty two parts of boric acid were mixed with about 1.05 quarts of ethyl alcohol (denatured was satisfactory). The same volume of gasoline was mixed with double the volume of carbon tetrachloride and the gasoline-carbon tetrachloride mixture added to the alcohol mixture.

A clear stable solution resulted which made woolen cloth completely moth resistant by immersion in it, as when dry cleaning the cloth, or by spraying the cloth with the solution.

A parallel procedure yielded a solution consisting of salicylic acid 254 grains, boric acid 184 grains, denatured alcohol 1000 cc., carbon tetrachloride 3000 cc. Goods treated by this formula in comparative tests withstood moth damage for months—better than any other organic solvent treated goods available in commerce.

The boric acid served to additionally render the cloth resistant to mildew. The boric acid was replaceable by oxalic acid, sodium benzoate, benzoic acid, citric acid, tartaric acid, and tannic acid for the same purpose.

Acetone, methyl alcohol and isopropyl alcohol were found to be useful substitutes for the alcohol, also ethylene glycol, mono-ethyl ether and butyl acetate, but most other commercial solvents for cleaning use proved to be precipitants for the salicylic acid.

If a heavier petroleum product than gasoline is used, the procedure should be varied. For kerosene, for instance, the following procedure was found useful.

215 grains of the mixed salicylic and boric acids were dissolved in about a pint and a half of ethyl alcohol and this solution was added to 1.36 quarts of carbon-tetrachloride. To this mixture was added an equal volume of kerosene, and then was added another pint and a half of the alcohol, producing a clear stable solution.

For preparing a solution in a relatively heavy petroleum product, 215 grains of the mixed acids were dissolved in a mixture containing 1.05 quarts each of alcohol and acetone, and the solution was added to the kerosene.

Another solution was prepared by dissolving 215 grains of the mixed acids in about a pint and a half of the alcohol mixed with about one-third of a quart of acetone, and this solution was mixed with a mixture containing 1.55 quarts each of kerosene and carbon tetrachloride.

It was found that the presence of carbon-tetrachloride with gasoline was unnecessary. In general the salicylic acid may be added to the usual grease-removing dry-cleaning fluids, if carried in alcohol in the proportion of one-half ounce to a point and a half of the alcohol, and the alcohol should be almost a fifth of the volume of dry cleaning fluids. More may be needed.

The salicylic acid has been found to be held by wool and other materials subject to attack by larvae of moths and carpet beetles and to make the material immune to such attacks.

Having thus described certain embodiments of the invention, what is claimed is:

1. A composition for simultaneously moth-proofing and dry cleaning including a grease-removing organic solvent in which salicylic acid is normally insoluble, and at least about one fifth of its volume of alcohol carrying salicylic acid in the proportion of toward an ounce to a gallon admixed therewith and also carrying boric acid.

2. A composition for simultaneously moth-proofing and dry cleaning including a grease-removing organic solvent in which salicylic acid is normally insoluble, and about one-fifth of its volume of alcohol mixed therewith and carrying boric acid and a somewhat larger porportion of salicylic acid, the two acids together totaling about one-half ounce.

3. The process of simultaneously cleaning and rendering resistant to moths a material including animal fibres which consists in dissolving saylicylic acid and boric acid in alcohol at the rate of about an ounce to a gallon, mixing the solution with a larger amount of a grease-removing organic solvent, and treating the material with the final mixture.

4. The process of simultaneously cleaning and rendering resistant to moths a material including animal fibres which consists in dissolving salicylic acid and boric acid in a hydrocarbon-miscible organic solvent for salicylic acid and boric acid, admixing the solution with grease-removing organic solvent consisting largely of volatile petroleum hydrocarbons, and treating the material with the mixture.

HENRY N. MITCHELL.